United States Patent
Lee et al.

(10) Patent No.: US 9,559,873 B2
(45) Date of Patent: Jan. 31, 2017

(54) SIGNAL RECEIVING APPARATUS BASED ON FASTER THAN NYQUIST AND SIGNAL DECODING METHOD THEREOF

(71) Applicant: ELECTRONICS AND TELECOMMUNICATIONS RESEARCH INSTITUTE, Daejeon (KR)

(72) Inventors: In Ki Lee, Daejeon (KR); Min Hyuk Kim, Daejeon (KR); Deock Gil Oh, Daejeon (KR); Ji Won Jung, Busan (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/617,087

(22) Filed: Feb. 9, 2015

(65) Prior Publication Data
US 2015/0237407 A1  Aug. 20, 2015

(30) Foreign Application Priority Data
Feb. 17, 2014  (KR) .................. 10-2014-0018121

(51) Int. Cl.
*H04N 21/2315* (2011.01)
*H04L 25/03* (2006.01)
(Continued)

(52) U.S. Cl.
CPC .............. *H04L 25/03* (2013.01); *H04L 1/005* (2013.01); *H04L 1/0057* (2013.01); *H04L 1/0071* (2013.01); *H04L 25/03318* (2013.01)

(58) Field of Classification Search
None
See application file for complete search history.

(56) References Cited

U.S. PATENT DOCUMENTS

| 5,432,803 A * | 7/1995 | Liu | H03M 13/3961 375/340 |
| 6,467,064 B1 * | 10/2002 | Anan | H03M 13/3961 714/795 |

(Continued)

FOREIGN PATENT DOCUMENTS

KR   20110061309 A   6/2011

OTHER PUBLICATIONS

John B. Anderson, et al; "Faster-Than-Nyquist Signaling", Proceedings of the IEEE, vol. 101, No. 8, Aug. 2013, pp. 1817-1830.

*Primary Examiner* — Brian T Pendleton
*Assistant Examiner* — Jean D Saint Cyr
(74) *Attorney, Agent, or Firm* — Ladas & Parry LLP

(57) ABSTRACT

Disclosed are a signal receiving apparatus based on FTN and a signal decoding method thereof, and the apparatus includes: an equalizer calculating, when a signal sampled by Fast to Nyquist (FTN) is received on a communication channel, a posterior probability of information bits and calculating a log likelihood ratio by using the calculated posterior probability; a deinterleaver deinterleaving bit data output from the equalizer; a decoder correcting of signal interference of the data bits deinterleaved by the deinterleaver by using the LLR and decoding the corrected signal interference; and an interleaver interleaving data output from the decoder to provide the interleaved data to the equalizer.

13 Claims, 7 Drawing Sheets

(51) Int. Cl.
*H04L 25/08* (2006.01)
*H04L 1/00* (2006.01)

(56) References Cited

U.S. PATENT DOCUMENTS

| | | | | |
|---|---|---|---|---|
| 7,602,863 | B2* | 10/2009 | Kovintavewat | H04L 25/03337 375/262 |
| 8,175,466 | B2* | 5/2012 | Djordjevic | H04B 10/60 398/202 |
| 8,185,796 | B2* | 5/2012 | Djordjevic | H03M 13/1117 714/755 |
| 2002/0154712 | A1* | 10/2002 | Cideciyan | G11B 20/10046 375/341 |
| 2005/0193044 | A1* | 9/2005 | Neurohr | G06F 7/22 708/200 |
| 2008/0056181 | A1* | 3/2008 | Imamura | H04L 1/0003 370/329 |
| 2008/0056401 | A1* | 3/2008 | Yamagishi | H04L 25/03197 375/265 |
| 2011/0188550 | A1* | 8/2011 | Wajcer | H04L 25/068 375/214 |
| 2011/0314352 | A1* | 12/2011 | Djordjevic | H03M 13/1117 714/752 |
| 2014/0226231 | A1* | 8/2014 | Blinick | G11B 20/10046 360/39 |

* cited by examiner

|     | t+1 | t | t11 | T |
|-----|-----|---|-----|---|
| (a) | 0 | 0 | 0 | -1.390080 |
| (b) | 0 | 0 | 1 | -1.095634 |
| (c) | 0 | 1 | 0 | 0.801187 |
| (d) | 0 | 1 | 1 | 1.095634 |
| (e) | 1 | 0 | 0 | -1.095634 |
| (f) | 1 | 0 | 1 | -0.81187 |
| (g) | 1 | 1 | 0 | 1.095634 |
| (h) | 1 | 1 | 1 | 1.390080 |

SIGNAL RECEIVING APPARATUS BASED ON FASTER THAN NYQUIST AND SIGNAL DECODING METHOD THEREOF

CROSS-REFERENCE TO RELATED APPLICATIONS

This application claims priority to and the benefit of Korean Patent Application No. 10-2014-0018121 filed in the Korean Intellectual Property Office on Feb. 17, 2014, the entire contents of which are incorporated herein by reference.

TECHNICAL FIELD

The present invention relates to a signal receiving apparatus based on faster than Nyquist (FTN) and a signal decoding method thereof, and particularly, to a technology that decodes a received signal by using FTN in a DVB-S2 based satellite communication system.

BACKGROUND ART

A DVB-S2x system acquired by enhancing a DVB-S2 system is discussed in a standard due to securement of a higher transmission capacity than DVB-S2 which is the existing satellite broadcasting system, increment of service availability through an enhanced link margin, actualization of a new service requirement of broadband broadcasting such as an HDTV, and the appearance of a Ka band satellite system.

In the DVB-S2x system, as a method for improving transmission efficiency, a Faster Than Nyquist (FTN) transmission mode is considered. The FTN transmission mode transmits a signal more highly than a Nyquist speed given in a frequency band to improve the transmission efficiency.

However, when the FTN transmission mode is used in a general transmitter and a general receiver, the transmission efficiency increases, but self-noise increases to exert a bad influence on system performance.

SUMMARY OF THE INVENTION

The present invention has been made in an effort to provide a signal receiving apparatus based on FTN and a signal processing method thereof that prevent decoding performance from being deteriorated due to inter-symbol interference while improving transmission efficiency by using an FTN transmission mode.

An exemplary embodiment of the present invention provides a signal receiving apparatus based on FTN, including: an equalizer calculating, when a signal sampled by Fast to Nyquist (FTN) is received on a communication channel, a posterior probability of information bits and calculating a log likelihood ratio by using the calculated posterior probability through a BCJR algorithm; a deinterleaver deinterleaving bit data output from the equalizer; a decoder correcting of signal interference of the data bits deinterleaved by the deinterleaver by using the LLR and decoding the corrected signal interference; and an interleaver interleaving data output from the decoder to provide the interleaved data to the equalizer.

The equalizer may be a Viterbi equalizer that equalizes a received signal by using a BCJR algorithm of a convolution encoder.

The equalizer may estimate a channel memory state according to an interference amount of the received signal.

The equalizer may calculate a branch metric according to state information transited to a next state from the estimated state information.

The equalizer may invert the branch metric when the information bits for the channel memory state are 10 and 01.

The equalizer may calculate a forward state metric and a backward state metric by using the branch metric and calculate the LLR by using probability components corresponding to the forward state metric, the backward state metric, and the branch metric.

The decoder may compare data bits estimated to correspond to the size of an interference amount for the received signal and data bits encoded by a transmitting unit to output reliability depending on data decoding.

Another exemplary embodiment of the present invention provides a signal receiving method, including: calculating, by an equalizer, when a signal sampled by Fast to Nyquist (FTN) is received on a communication channel, a posterior probability of information bits through a BCJR algorithm; calculating, by the equalizer, a log likelihood ratio by using the calculated posterior probability; deinterleaving, by a deinterleaver, bit data output from the equalizer; correcting, by a decoder, signal interference of the data bits deinterleaved by the deinterleaver by using the LLR and decoding the corrected signal interference; and interleaving, by an interleaver, data output from the decoder to provide the interleaved data to the equalizer.

The equalizer is a Viterbi equalizer that equalizes a received signal by using a BCJR algorithm of a convolution encoder.

The method may further include estimating a channel memory state according to an interference amount of the received signal, before the calculating of the posterior probability of the information bits for the received signal.

In the calculating of the posterior probability of the information bits for the received signal, a branch metric may be calculated depending on state information transited to a next state from the estimated channel memory state.

The calculating of the posterior probability of the information bits for the received signal may include inverting the branch metric when the information bits for the channel memory state are 10 and 01.

In the calculating of the LLR, the LLR may be calculated by using probability components corresponding to the branch metric, and a forward state metric and a backward state metric by using the branch metric.

The method may further include comparing data bits estimated to correspond to the size of an interference amount for the received signal and data bits encoded by a transmitting unit to output reliability depending on data decoding.

According to exemplary embodiments of the present invention, decoding performance is prevented from being deteriorated due to inter-symbol interference while improving transmission efficiency by using an FTN transmission mode.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

Objects of the present invention are not limited the aforementioned object and other objects and advantages of the present invention, which are not mentioned can be appreciated by the following description and will be more apparently know by the exemplary embodiments of the present invention. It can be easily known that the objects and advantages of the present invention can be implemented by the means and a combination thereof described in the appended claims.

BRIEF DESCRIPTION OF THE DRAWINGS

FIG. 2 is an exemplary diagram referred to describe a data prediction operation of the signal receiving apparatus based on FTN according to the exemplary embodiment of the present invention.

Figure 1:
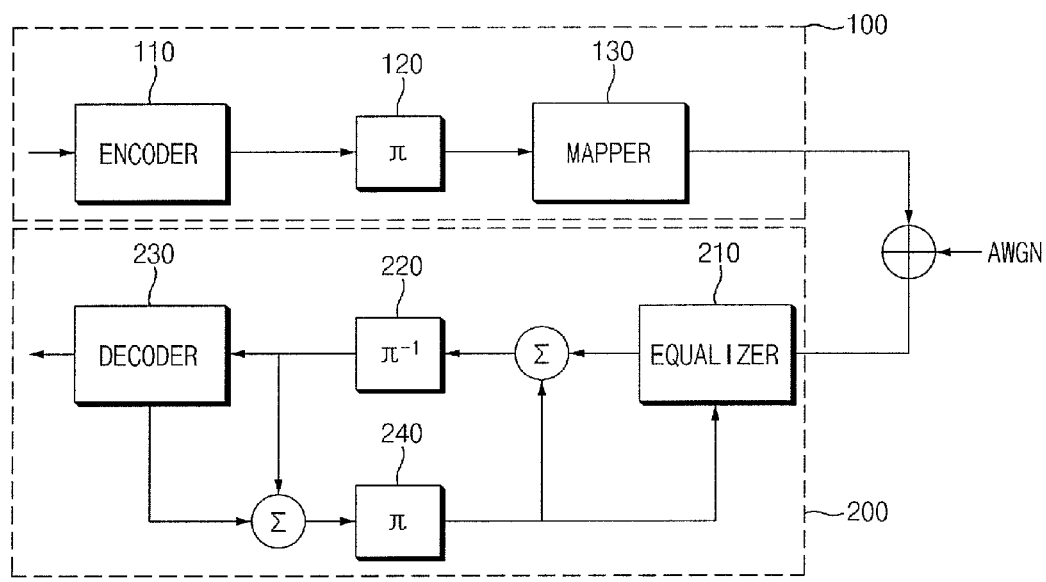
FIG. 1 is a diagram referred to describe a configuration of a signal receiving apparatus based on FTN according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present invention will be described in detail with reference to the accompanying drawings. In this case, like reference numerals refer to like elements in the respective drawings. A detailed description of an already known function and/or configuration will be skipped. In contents disclosed hereinbelow, a part required for understanding an operation according to various exemplary embodiments will be described in priority and a description of elements which may obscure the spirit of the present invention will be skipped.

Some components of the drawings may be enlarged, omitted, or schematically illustrated. An actual size is not fully reflected on the size of each component and therefore, contents disclosed herein are not limited by relative sizes or intervals of the components drawn in the respective drawings.

FIG. 1 is a diagram referred to describe a configuration of a communication system in which a signal receiving apparatus based on FTN is adopted according to an exemplary embodiment of the present invention.

Referring to FIG. 1, the communication system according to the present invention includes a transmitting apparatus 100 and a receiving apparatus 200. In this case, it is assumed that in the communication system according to the present invention, a signal transferred between the transmitting apparatus 100 and the receiving apparatus 200 through a wireless channel is a signal (hereinafter, referred to as an 'FTN signal') sampled in a faster than Nyquist mode in order to secure a high transmission speed.

First, the transmitting apparatus 100 may include an encoder 110, an interleaver 120, and a mapper 130.

When transmission data is input, the encoder 110 performs encoding according to a predetermined mode for information bits of the input transmission data and outputs the resulting encoded bits. Herein, the encoder 110 encodes the information bits of the transmission data by using a low density parity check code (LDPC) mode.

The bits encoded in the LDPC mode by the encoder 110 are transferred to the mapper 130 through the interleaver 120.

The interleaver 120 relocates an arrangement order of the bits encoded by the encoder 110 according to a predetermined unit to transfer the relocated arrangement order to the mapper 130. Herein, the bits relocated by the interleaver 120 may be restored to an original state by a deinterleaver 220 of the receiving apparatus 200 to be described below.

The interleaver 120 serves to distribute a Burst error which occurs on the wireless channel at the time of transmitting the signal in the transmitting apparatus 100. Accordingly, performance depending on channel transmission may be enhanced by correcting the Burst error by only a channel encoding technique on the wireless channel.

The mapper 130 maps the bits transferred from the interleaver 120 to a data symbol according to a predetermined mode. In this case, the mapper 130 may map predetermined bitstreams to a position on signal constellation. In this case, the mapper 130 may perform symbol mapping by using digital modulation modes such as m-phase shift keying (PSK) and quadrature amplitude modulation (QAM). Of course, the mapping mode is not limited to any one and in some exemplary embodiments, the mapping mode may be variously applied.

In this case, the mapper 130 transmits an output signal on the wireless channel through an antenna (not illustrated).

Meanwhile, the receiving apparatus 200 receives and decodes the signal encoded by the transmitting apparatus 100 through the wireless channel. In this case, the signal received from the wireless channel is a signal to which predetermined additive white Gaussian noise (AWGN) is added.

Therefore, the receiving apparatus 200 may include an equalizer 210, a deinterleaver 220, a decoder 230, and an interleaver 240.

When the FTN signal on the wireless channel is received through the antenna (not illustrated), the equalizer 210 equalizes data of the received FTN signal.

In this case, the FTN signal received through the antenna is high in transmission speed, but intersymbol interference (ISI) occurs in the FTN signal. Accordingly, the equalizer 210 performs equalization concatenated with a channel code of a received signal so as to overcome the ISI to remove self-noise.

In this case, as the equalizer 210, a Viterbi equalizer may be adopted, which performs equalization by using a Bahl Cocke Jelineck Raviv (BCJR) algorithm which is a soft output Viterbi algorithm (SOVA) of a convolution encoder 110.

In this case, the equalizer 210 calculates a posterior probability of the input information bits to calculate a log likelihood ratio (LLR), through the BCJR algorithm. The log likelihood ratio (LLR) may be implemented as shown in [Equation 1] below.

$$L(d_k) = \log\left(\frac{Pr(dk = 1 \mid \text{observation})}{Pr(dk = 0 \mid \text{observation})}\right) \quad \text{[Equation 1]}$$

$$= \frac{P_r(d_k = 1, S_k = m \mid R_1^N)}{P_r(d_k = 0, S_k = m \mid R_1^N)}$$

$$= \log\frac{\sum_m \lambda_k^{1,m}}{\sum_m \lambda_k^{0,m}}$$

In [Equation 1], $d_k$ represents a k-th information bit, $S_k$ represents a channel memory state in a k-th symbol section, R represents a received symbol, N represents the total number of received signal symbols, λ represents the posterior probability, and $L(d_k)$ represents the LLR of $d_k$.

Herein, probability components for the posterior probability may be defined as probability functions corresponding to a forward state metric (FSM), a backward state metric (BSM), and a branch metric (BM).

In this case, the respective probability functions corresponding to the FSM, the BSM, and the BM refer to [Equation 2] below.

$$\alpha_k^m = P_r(R_1^{k-1} \mid d_k=i, S_k=m, R_k^N)$$

$$\beta_k^{i,m} = P_r(R_{k+1}^N \mid d_k=i, S_k=m, R_1^k)$$

$$\delta_k^{i,m} = P_r(d_k=i, S_k=m, R_k) \quad \text{[Equation 2]}$$

Wherein, α represents the forward state metric (FSM), β represents the backward state metric (BSM), and δ represents the branch metric (BM).

In this case, respective probability components of [Equation 2] are applied to the posterior probability of [Equation 1] to derive [Equation 3] as shown below.

$$L(d_k) = \log\frac{\sum_m \alpha_k^m \beta_{k+1}^{f(0,m)} \delta_k^{0,m}}{\sum_m \alpha_k^m \beta_{k+1}^{f(1,m)} \delta_k^{1,m}} \quad \text{[Equation 3]}$$

As shown in [Equation 3], the equalizer 210 calculates a final LLR by using the FSM, the BSM, and the BM.

In this case, the equalizer 210 outputs a softly decided symbol with an approximate value quantized by consecutive data or two or more data.

When data decoded by the decoder 230 has no error, the equalizer 210 receives the information bits interleaved through the interleaver 240 to be used as anterior probability information.

The deinterleaver 220 deinterleaves the signal in which the ISI is corrected by the equalizer 210. In this case, the deinterleaver 220 restores the arrangement order of the data bits relocated by the interleaver 120 of the transmitting apparatus 100 to previous-state bitstreams.

The decoder 230 decodes the bitstreams restored by the deinterleaver 220.

Herein, the decoder 230 decodes the bits in the same manner as the encoder 110 of the transmitting apparatus 100. In other words, the decoder 230 decodes the data bits of the received signal by using the LDPC mode.

In this case, the decoder 230 calculates the anterior information by using the LLR calculated by the equalizer 210 and outputs reliabilities for estimated data bits and encoded bits.

When there is no error in the decoded data, the reliabilities for the estimated data bits and the encoded bits are input into the interleaver 240 and the interleaver 240 interleaves the information bits output by the decoder 230 again. In this case, the information bits interleaved by the interleaver 240 are input into the equalizer 210 again.

Accordingly, the decoding process is performed repeatedly at the predetermined number of times.

FIG. 2 is an exemplary diagram referred to describe an estimated data detecting operation of the signal receiving apparatus based on FTN according to the exemplary embodiment of the present invention.

Referring to FIG. 2, the signal received by the receiving apparatus according to the present invention on the wireless channel of the communication system includes predetermined interference. In particular, a signal sampled in the FTN mode is influenced by the ISI.

Therefore, receiving apparatus may estimate the data encoded by the transmitting apparatus based on the size of an intersymbol interference amount. As one example, the size of the intersymbol interference amount may be implemented by a mapping table illustrated in FIG. 2.

Herein, in the present invention, since FTN is used, in which the number of signal filter tabs is 1 and the maximum interference amount is 50%, the signal is influenced by one anterior/poster datum around data at a current position. Accordingly, the receiving apparatus may estimate original data based on the size of the interference amount based on three data as illustrated in FIG. 2.

FIG. 2 illustrates the size of an interference amount for each datum when an interference amount τ is 20%. Herein, FIG. 2 illustrates the size T of the interference amount depending on data at positions t−1 and t+1 which anterior and posterior positions oft based on data at position t in the received signal.

First, when the data at t+1, t, and t−1 are '000' as illustrated in FIG. 2A, the size of the interference amount becomes 1.390080 and when the data at t+1, t, and t−1 are '001' as illustrated in FIG. 2B, the size of the interference amount becomes −1.095634. When the data at t+1, t, and t−1 are '010' as illustrated in FIG. 2C, the size of the interference amount becomes 0.801187 and when the data at t+1, t, and t−1 are '011' as illustrated in FIG. 2D, the size of the interference amount becomes 1.095634. When the data at t+1, t, and t−1 are '100' as illustrated in FIG. 2E, the size of the interference amount becomes −1.095634 and when the data at t+1, t, and t−1 are '101' as illustrated in FIG. 2F. the size of the interference amount becomes −0.801187.

Herein, since '000' and H '001' and '110', '010' and '101', and '011' and '100' are inverted values, the sizes of the interference amounts are the same as each other and one of two becomes a (−) value.

Accordingly, the receiving apparatus may estimate the original data for the interference amount for the received signal with reference to FIG. 2.

Figure 3:
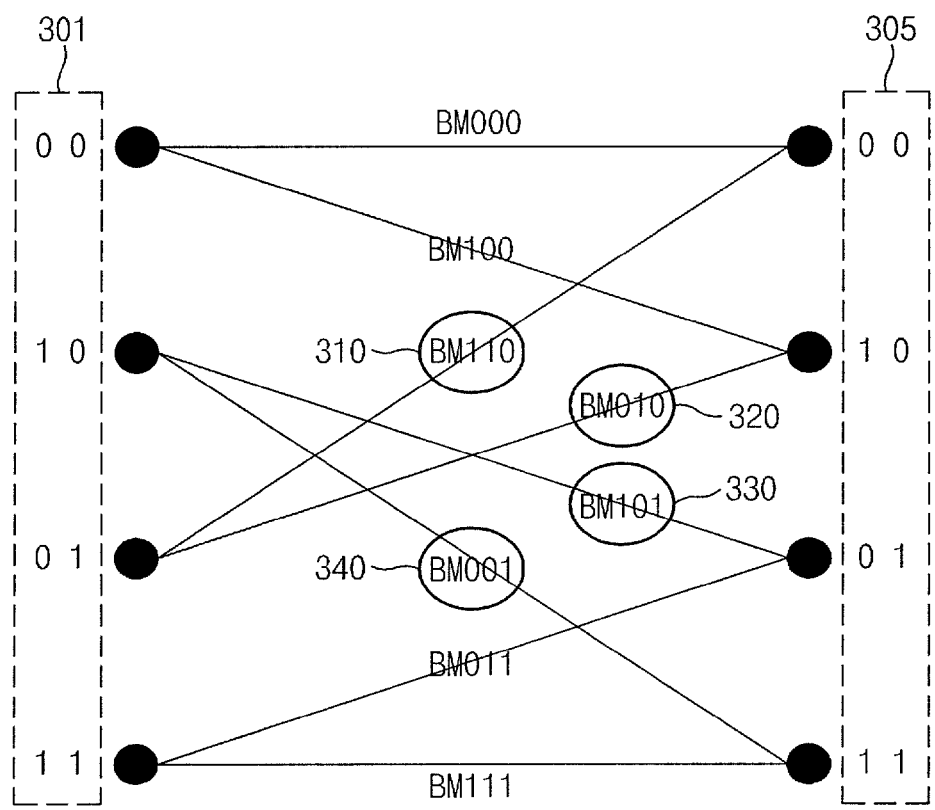
FIG. 3 is a diagram referred to describe a decoding operation of a signal receiving apparatus based on FTN according to an exemplary embodiment of the present invention.

FIGS. 3A and 3B are exemplary diagrams referred to describe a decoding operation of the signal receiving apparatus based on FTN according to an exemplary embodiment of the present invention and illustrate an operation for determining a state of a channel memory.

In the receiving apparatus according to the present invention, a state when the number of channel memories is 2 will be described as an example. In this case, the state of the channel memory is determined by using trellis representation illustrated in FIG. 3.

Herein, a trellis structure applied to FIGS. 3A and 3B is a structure adopting an SRRC filter in which LDPC coding rate is 1/2, a total data quantity is 106, a roll of factor of a filter is 0.35, and a filter tab is 1.

Referring to FIGS. 3A and 3B, state data of the channel memory which is implementable when the number of channel memories is 2 become '00', '10', '01', and '11'. In this case, transiting each state of the trellis representation to a next state is determined depending on what an information bit value newly input into the channel memory is and in this case, since two types of bits, that is, '0' and '1' are input as the information bits, the state transited to the next state may become two states.

In other words, the next state of '00' among '00', '10', '01', and '11' which are the current channel memory state data becomes '00' when the input information bit value '0' and '10' when the input information bit value is '1'. The next state of '10' becomes '01' when the input information bit value is '0' and '11' when the input information bit value is '1'. The next state of '01' becomes '00' when the input information bit value is '0' and '10' when the input information bit value is '1'. The next state of '11' becomes '01' when the input information bit value is '0' and '11' when the input information bit value is '1'.

In this case, when a difference between state transition probabilities applied onto each state transition path in the trellis representation is increased, a more accurate LLR may be calculated. Accordingly, in determining '10' and the next state for '10' among the current state data, the state transition value is inverted.

As one example, BM 010 applied as illustrated in FIG. 3A is inverted to 101 as illustrated in FIG. 3B on the state transition path of '10' to '01' and BM 110 applied as illustrated in FIG. 3A is inverted to 001 as illustrated in FIG. 3B on the state transition path of '10' to '11'.

BM 001 applied as illustrated in FIG. 3A is inverted to 110 as illustrated in FIG. 3B on the state transition path of '01' to '00' and BM 101 applied as illustrated in FIG. 3A is inverted to 010 as illustrated in FIG. 3B on the state transition path of '01' to '10'.

In this case, if a bit difference between BM '000' from the previous state '00' and BM '001' from the previous state '01' is 1 bit in FIG. 3A with respect to the next state '00', a difference between respective BMs '000' and '110' increases to 2 bits after inverting the BM in FIG. 3B.

Similarly, if a bit difference between BM '100' from the previous state '00' and BM '101' from the previous state '01' is 1 bit in FIG. 3A with respect to the next state '10', a difference between respective BMs '100' and '010' increases to 2 bits after inverting the BM in FIG. 3B.

If a bit difference between BM '010' from the previous state '10' and BM '011' from the previous state '11' is 1 bit in FIG. 3A with respect to the next state '01'. a difference between respective BMs '101' and '011' increases to 2 bits after inverting the BM in FIG. 3B.

Last, if a bit difference between BM '110' from the previous state '10' and BM '111' from the previous state '11' is 1 bit in FIG. 3A with respect to the next state '11', a difference between respective BMs '001' and '111' increases to 2 bits after inverting the BM in FIG. 3B.

As described above, by inverting the BMs for '10' and '01' as illustrated in FIG. 3B, the inter-BM difference in the next state increases to calculate an accurate LLR.

Figure 4A:
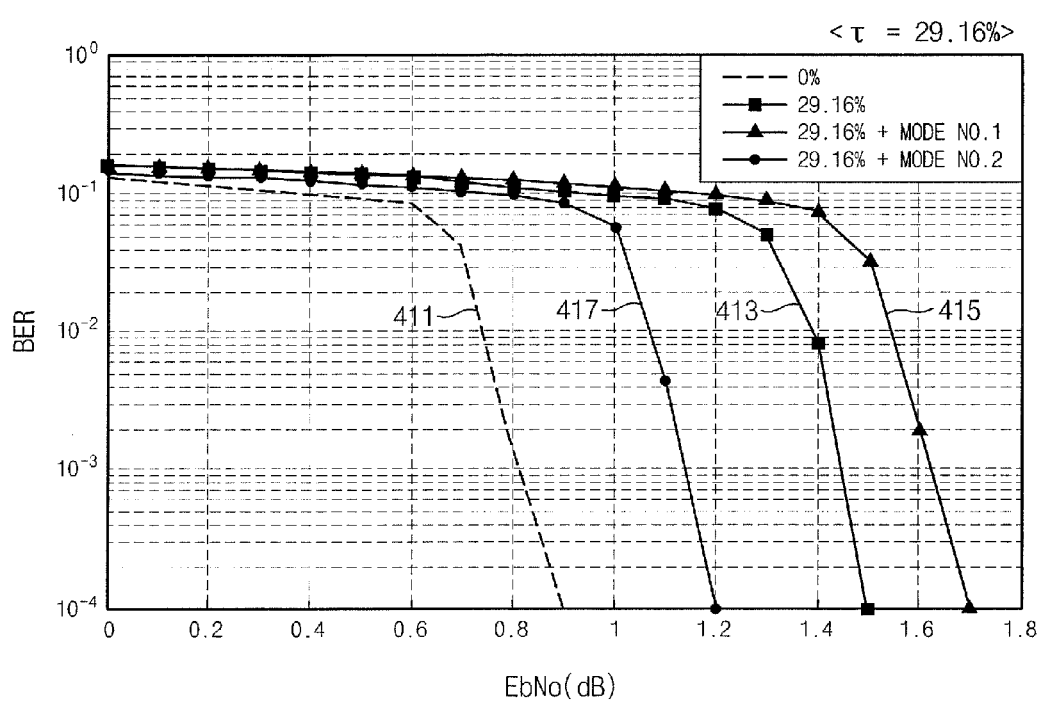
FIGS. 4A to 4C are exemplary diagrams referred to describe an FTN performance monitoring result of the signal receiving apparatus based on FTN according to the exemplary embodiment of the present invention.
Figure 4B:
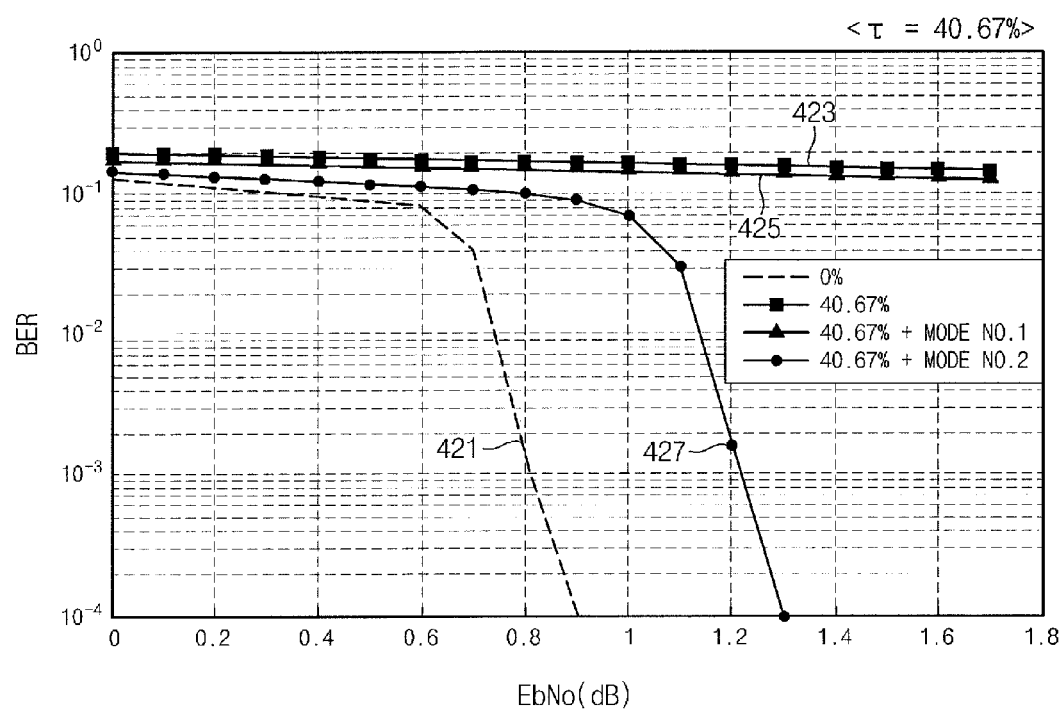
Figure 4C:
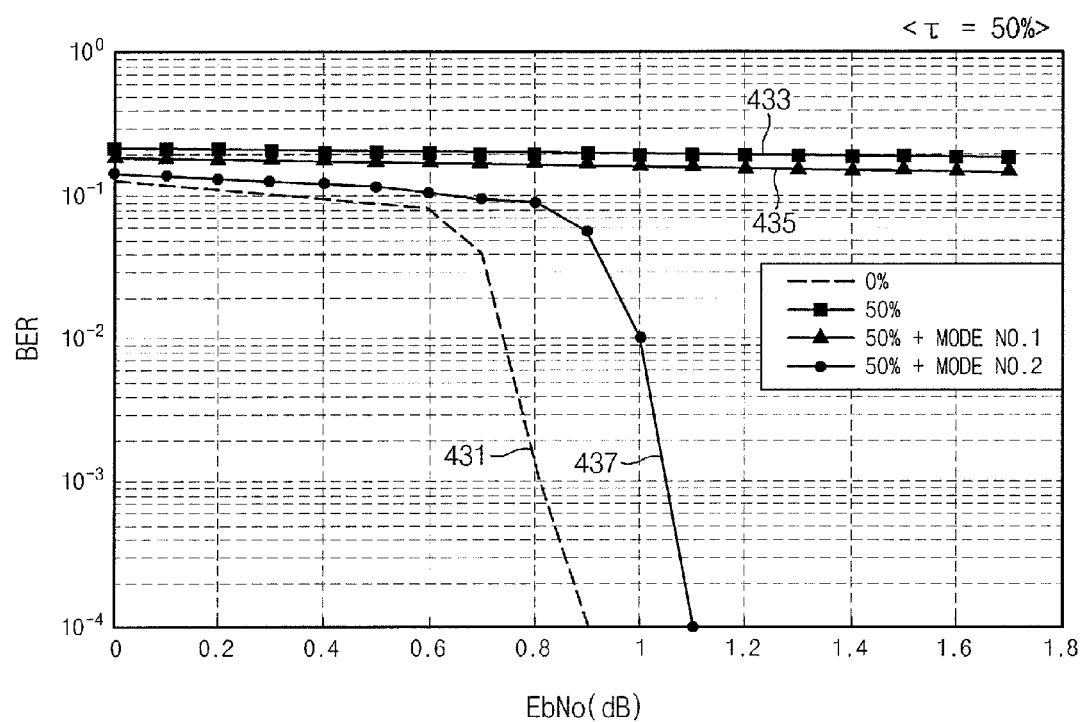

FIGS. 4A to 4C are exemplary diagrams referred to describe an FTN performance simulation result of the signal receiving apparatus based on FTN according to the exemplary embodiment of the present invention.

In this case, FIG. 4A illustrates a performance simulation result when the interference amount is 29.16%, FIG. 4B illustrates a performance simulation result when the interference amount is 40.60%, and FIG. 4C illustrates a performance simulation result when the interference amount is 50%.

It is assumed that as parameters applied to simulation for performance measurement of FIGS. 4A to 4C, the LDPC coding rate is 1/2, the total data quantity is $10^6$, as the filter, the square-root-raised-cosine (SRRC) filter in which the roll of factor is 0.35 and the filter tab is 1 is applied. The number of repeated decoding times is fixed to 60 inner iteration (LDPC decoder) times and 4 outer iteration (Turbo Equalization) times which are optimal simulation results.

The respective simulation results of FIGS. 4A to 4C by the parameter illustrate graphs when the trellis representation of FIG. 3A and the trellis representation of FIG. 3B are respectively applied.

In FIGS. 4A to 4C, reference numerals 411, 421, and 431 represent signals without interference, reference numerals 412, 422, and 432 represent signals with interference, reference numerals 413, 423, and 433 represent signals decoded by using the trellis representation of FIG. 3A, and reference numerals 414, 424, and 434 represent signals decoded by using the trellis representation of FIG. 3B.

In this case, it can be seen that in an area in which the ISI frequently starts to occur, the graphs of reference numerals 414, 424, and 434 are detected similarly as the graphs of reference numerals 411, 421, and 431, while the graphs of reference numerals 413, 423, and 433 are detected similarly as the graphs of reference numerals 412, 422, and 432.

As described above, the mode of FIG. 3B is applied to equalizing the received signal in the receiving apparatus according to the present invention to implement a decoding function with high performance.

An operation flow of the signal receiving apparatus based on FTN according to the present invention, which is configured as above will be described below in more detail.

Figure 5:
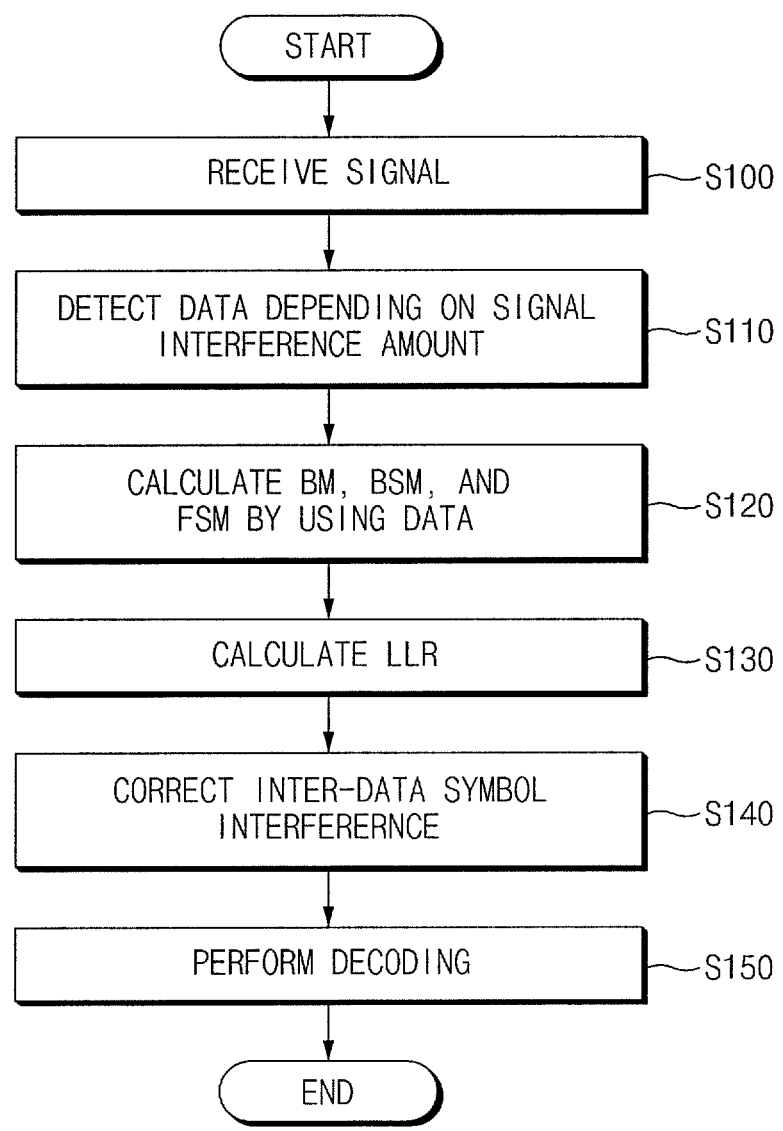
FIG. 5 is a flowchart illustrating an operation flow for a signal processing method of a signal receiving apparatus based on FTN according to another exemplary embodiment of the present invention.

FIG. 5 is a flowchart illustrating an operation flow for a signal processing method of a signal receiving apparatus based on FTN according to another exemplary embodiment of the present invention.

Referring to FIG. 5, when a receiving apparatus receives a signal through an antenna (S100), the receiving apparatus estimates a channel memory state of data encoded by a transmitting apparatus according to a signal interference amount of the received signal and detects estimated data (S110).

In this case, the receiving apparatus calculates a branch metric (BM) according to state data transited to a next state for the estimated state information during 'S110' and calculates a forward state metric (FSM) and a backward state metric (BSM) through the calculated BM (S120).

Herein, a detailed description of the processing of calculating the branch metric (BM) according to the channel memory state will be made with reference to FIG. 3B.

Thereafter, the receiving apparatus may calculate the log likelihood ratio (LLR) for the data bits by using the forward state metric (FSM), the backward state metric (BSM), and the branch metric (BM) calculated during 'S120' (S130).

Herein, the receiving apparatus corrects inter-data symbol interference by applying the LLR calculated during 'S130' (S140) and decodes data bits interference-corrected during 'S140' (S150).

Meanwhile, the present invention can be implemented by a processor readable code in a processor readable recording medium when various exemplary embodiments discussed above are executed by one or more computers or processors. The processor-readable recording medium includes all kinds of recording apparatuses in which processor-readable data are stored. Examples of the processor readable recording medium include ROM, RAM, CD-ROM, a magnetic tape, a floppy disk, an optical data storing device and the processor readable recording medium may also be implemented in a form of a carrier wave such as transmission through the Internet. The processor-readable recording medium is distributed in a computer system connected to a network, and the processor-readable code may be stored and executed by a distribution method.

The specified matters and limited embodiments and drawings such as specific components in the present invention have been disclosed for illustrative purposes, but are not limited thereto, and those skilled in the art will appreciate that various modifications and changes can be made in the art to which the present invention belongs, within the scope without departing from an essential characteristic of the present invention. The spirit of the present invention should not be defined only by the described exemplary embodiments, and it should be appreciated that and claims to be described below and all technical spirits which evenly or equivalently modified are included in the claims of the present invention.

What is claimed is:

1. A signal receiving apparatus based on FTN, the apparatus comprising:
   an equalizer calculating, when a signal sampled by Fast to Nyquist (FTN) is received on a communication channel, a posterior probability of information bits and calculating a log likelihood ratio (LLR) by using the calculated posterior probability through a Bahl Cocke Jelineck Raviv (BCJR) algorithm;
   a deinterleaver deinterleaving bit data output from the equalizer;
   a decoder correcting of signal interference of the data bits deinterleaved by the deinterleaver by using the LLR and decoding the corrected signal interference; and
   an interleaver interleaving data output from the decoder to provide the interleaved data to the equalizer,
   wherein the equalizer calculates a branch metric according to state information transited to a next state from the estimated state information, and
   wherein the equalizer calculates a forward state metric and a backward state metric by using the branch metric and calculates the LLR by using probability components corresponding to the forward state metric, the backward state metric, and the branch metric.

2. The apparatus of claim 1, wherein the equalizer is a Viterbi equalizer that equalizes a received signal by using a BCJR algorithm of a convolution encoder.

3. The apparatus of claim 1, wherein the equalizer estimates a channel memory state according to an interference amount of the received signal.

4. A signal receiving apparatus based on FTN, the apparatus comprising:
   an equalizer calculating, when a signal sampled by Fast to Nyquist (FTN) is received on a communication channel, a posterior probability of information bits and calculating a log likelihood ratio (LLR) by using the calculated posterior probability through a Bahl Cocke Jelineck Raviv (BCJR) algorithm;
   a deinterleaver deinterleaving bit data output from the equalizer;
   a decoder correcting of signal interference of the data bits deinterleaved by the deinterleaver by using the LLR and decoding the corrected signal interference; and
   an interleaver interleaving data output from the decoder to provide the interleaved data to the equalizer,
   wherein the equalizer estimates a channel memory state according to an interference amount of the received signal,
   wherein the equalizer calculates a branch metric according to state information transited to a next state from the estimated state information, and
   wherein the equalizer inverts the branch metric when the information bits for the channel memory state are 10 and 01.

5. The apparatus of claim 1, wherein the decoder compares data bits estimated to correspond to the size of an interference amount for the received signal and data bits encoded by a transmitting unit to output reliability depending on data decoding.

6. A signal receiving method, comprising:
   calculating, by an equalizer, when a signal sampled by Fast to Nyquist (FTN) is received on a communication channel, a posterior probability of information bits through a Bahl Cocke Jelineck Raviv (BCJR) algorithm;
   calculating, by the equalizer, a log likelihood ratio (LLR) by using the calculated posterior probability;
   deinterleaving, by a deinterleaver, bit data output from the equalizer;
   correcting, by a decoder, signal interference of the data bits deinterleaved by the deinterleaver by using the LLR and decoding the corrected signal interference; and
   interleaving, by an interleaver, data output from the decoder to provide the interleaved data to the equalizer,
   wherein in the calculating of the posterior probability of the information bits for the received signal, a branch metric is calculated depending on state information transited to a next state from the estimated channel memory state, and
   wherein in the calculating of the LLR, the LLR is calculated by using probability components corresponding to the branch metric, and a forward state metric and a backward state metric by using the branch metric.

7. The method of claim 6, wherein the equalizer is a Viterbi equalizer that equalizes a received signal by using a BCJR algorithm of a convolution encoder.

8. The method of claim 6, further comprising:
   estimating a channel memory state according to an interference amount of the received signal, before the calculating of the posterior probability of the information bits for the received signal.

9. The method of claim 6, wherein the calculating of the posterior probability of the information bits for the received signal includes inverting the branch metric when the information bits for the channel memory state are 10 and 01.

10. The method of claim 6, further comprising:
    comparing data bits estimated to correspond to the size of an interference amount for the received signal and data bits encoded by a transmitting unit to output reliability depending on data decoding.

11. The apparatus of claim 4, wherein the equalizer is a Viterbi equalizer that equalizes a received signal by using a BCJR algorithm of a convolution encoder.

12. The apparatus of claim 4, wherein the decoder compares data bits estimated to correspond to the size of an interference amount for the received signal and data bits encoded by a transmitting unit to output reliability depending on data decoding.

13. The apparatus of claim 3, wherein the equalizer inverts the branch metric when the information bits for the channel memory state are 10 and 01.

* * * * *